Feb. 23, 1965 L. ANDERLIE 3,170,458
ICE FISHING HOLE HEATER
Filed March 22, 1963
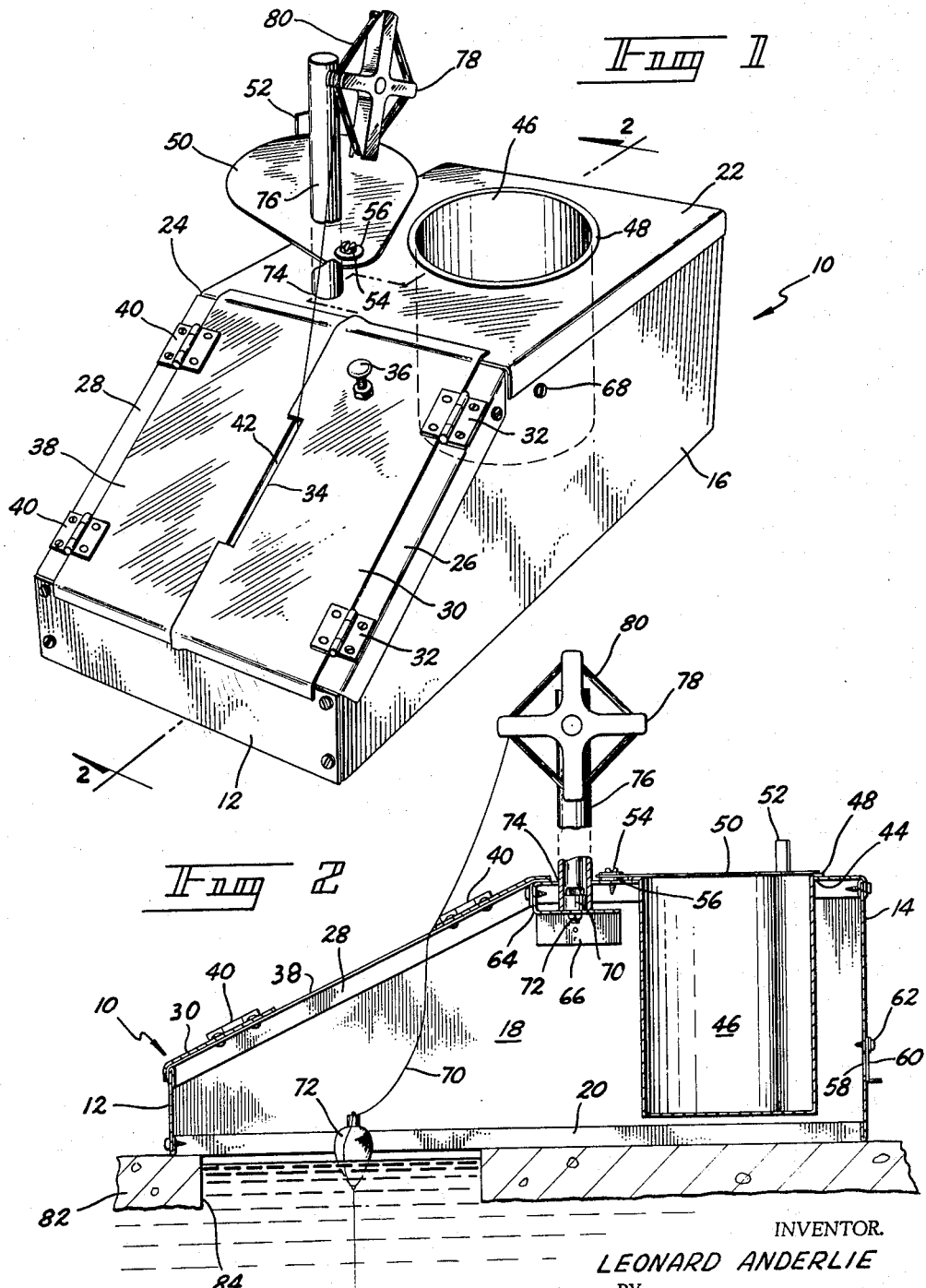
INVENTOR.
LEONARD ANDERLIE
BY
Meyers & Peterson
Attorneys

3,170,458
ICE FISHING HOLE HEATER
Leonard Anderlie, 6813 Beard Ave. N., Minneapolis 19, Minn.
Filed Mar. 22, 1963, Ser. No. 267,221
9 Claims. (Cl. 126—271.3)

This invention relates generally to ice fishing accessories, and pertains more particularly to an ice fishing hole heater.

The principal object of the invention is to prevent ice fishing holes from freezing over. In this regard, it is an aim of the invention to provide sufficient heat in an efficient manner so as to keep the hole completely open during even the lowest temperatures.

Another object of the invention is to provide a heater that will not interfere with the catching of fish. In this regard, it is an aim of the invention to provide a heating device that permits the use of a fairly large ice fishing hole, for instance on the order of ten inches in diameter, and which will provide ready access to the hole. More specifically, it is contemplated that a pair of hinged doors be disposed on a slant or incline with a relatively low forward edge so that the fish can be easily pulled out with a minimum of possible obstruction that might result in the loss of the fish.

Another object of the invention is to provide a heating device that allows substantially full visibility of what is occurring beneath the ice. In other words, the fisherman has almost a full range of vision with respect to looking down into the hole at various angles. More precisely, the fisherman had good visibility throughout an arc of approximately 270 degrees.

A further object of the invention is to provide for the facile replenishing of fuel as it is consumed. It is within the purview of the invention to employ a removable receptacle that is open at the top and into which can be placed such fuel as charcoal. The use of such a receptacle that is merely suspended into the interior of the device not only allows fresh fuel to be added very easily, but it also permits the fuel to be conveniently dumped when the fisherman is ready to leave the site.

Still another object of the invention is to provide a damper associated with the receptacle in which the fuel is contained so that the amount of air admitted to the receptacle can be easily controlled. Consequently, no more fuel than is necessary need by burned during a given period of time. Also, it is within the control of the user to adjust the damper so as to provide adequate heat for warming his hands and other parts of his body when it is desired to do so, this usually requiring a greater amount of heat than that needed to just keep the hole from freezing. It is also an aim of the invention to provide a second damper that controls the admission of air into the interior of the device, it being planned that the second damper and the relatively small aperture with which it cooperates be disposed so that when this particular end of the heater faces into the wind, thereby permitting the air to blow into the interior and at a rate to cause good circulation of the heater air, if circumstances so require.

Yet another object of the invention is to provide a heater of the foregoing character that will not permit the fishing line to burn as has been the case in certain prior art heating devices.

A still further feature of the invention is to provide doors that move away from the fishing line when being opened, thereby permitting rapid access to the ice fishing hole without jarring the line. It is also an aim to have one of the doors provided with a longitudinal notch along the marginal edge thereof that overlaps the other door so that a slot is formed when the two doors are closed, thereby preventing any restriction or restraint that would be placed on the free movement of the fishing line. It is also possible to tape the edges of the slot thus formed so that the fishing line never freezes to either of the doors, thereby further assuring free line movement at all times.

Another object of the invention is to provide a heater for keeping fishing holes open which is relatively inexpensive to fabricate, which would normally last a lifetime, which is very simple, and which can be easily carried from place to place.

These and other objects and advantages of my invention will more fully appear from the following description, made in connection with the accompanying drawing, wherein like reference characters refer to the same or similar parts throughout the several views and in which:

FIGURE 1 is a perspective view of my ice fishing hole heater, and

FIGURE 2 is a longitudinal sectional view taken in the direction of line 2—2 of FIGURE 1.

Referring now in detail to the drawing, it is to be observed that the casing has been denoted in its entirety by the reference numeral 10. The casing comprises a relatively low front wall 12 and a relatively high rear wall 14. A pair of parallel side walls 16, 18 extend between the walls 12, 14. Since the lower edges of the walls 12, 14, 16 and 18 form an open bottom, in order to avoid any chance of confusion with respect to FIGURE 2, it should be pointed out that the lower marginal edge of each of the side walls 16, 18 is reversely bent for reinforcing purposes, the reversely bent strip portion bearing the reference numeral 20. Hench, when viewing FIGURE 2, what might seem to be a bottom panel is acually only the integral strip 20 that is used for reinforcng purposes.

The top of the casing 10 includes a horizontal flat panel 22 that extends forwardly from the upper rear edge of the rear wall 14 toward the front wall 12 but which terminates at an intermediate locus labeled 24. Thus, it will be appreciated that the side walls 16, 18 have upper edges that are parallel to their lower edges throughout almost half of the casing's length, the parallelism terminating at the locus labeled 24. From the locus 24 to the front wall 12 the upper edges slope downwardly as is evident from both of the views that have been presented. Associated with the inclined or sloping edges of the walls 16, 18 are channel members 26 and 28, respectively. The channel-shaped configuration is not readily apparent, but it will be recognized that the channels 26, 28 are susceptible to modification, their precise configuration not being essential.

It is important to understand that the slope imparted to the forward portion of the casing 10 is responsible for facilitating the removal of a fish that is caught when using the heater and also by reason of the sloping construction good visibility of what is occurring beneath the ice can be had. Cooperating in the achieving of these desirable goals is a first door 30 pivotally connected to the channel member 26 through the agency of a pair of hinges 32. The free edge of the door 30, this being the edge remote from the hinged edge, is longitudinally notched at 34. As the description progresses, it will be perceived that the notch 34 permits the accommodation of a fishing line. However, at this point it is to be observed that the door 30 can be quickly opened by grasping a knob 36 affixed thereto. A second door 38 is pivotally connected to the channel member 28 by means of a second pair of hinges identified by the reference numeral 40. Having mentioned the notch 34, it can now be said that the free edge of the door 38 forms a slot 42 by virtue of the space provided by said notch 34.

Attention is now directed to a circular opening 44 (see FIGURE 2) formed in the top panel 22. The opening 44 permits the suspension of a metal receptacle 46 having a laterally extending flange 48 thereon which rests against the marginal portion of the top panel 22 circumjacent the opening 44. While not shown, the receptacle 46 is intended to contain a suitable fuel, such as ordinary charcoal, and it will be appreciated that the receptacle 46 is open at its upper end so that the fuel can be replenished very readily as required.

For the purpose of controlling the amount of air admitted to the receptacle 46 via its flanged opening, there is a pivotal plate or damper 50 having an upturned actuating tab 52. The end of the damper 50 opposite the tab 52 is pivotally attached to the top panel 22 by a lag screw 54 that serves as a pivot point, there being a washer 56 of a thickness commensurate with the thickness of the flange 48 on the receptacle 46. In this way, the damper 50 can be moved into any selected angular position so as to partially block or completely close the flanged end of the receptacle 46. The damper 50 can be employed to fully block the open end of the receptacle 56 if it is desired to do so.

Whereas the damper 50 is intended to control the amount of air admitted to the receptacle 46, an aperture or air opening 58 is also provided. Cooperable with the aperture 58 is a damper 60 that is pivotally mounted on a lag screw 62. The role played by the opening 58 is to permit a controlled amount of air to enter the interior of the casing 10 when the opening 58 is directed into the wind. The damper 60 can fully block this opening 58 or can allow a certain amount of air to enter. It will be understood that an enhanced circulation of air heated by the receptacle 46 can result, for the air entering due to wind conditions can force air within the casing that has already been warmed forwardly so that it later escapes outwardly through the slot 42.

For the sake of completeness, it will be pointed out that the forward edge of the top panel 22 is formed with a channel-shaped configuration as indicated by the reference numeral 64 in FIGURE 2, this being subjacent the locus 24. This provides a shelf and the ends of the shelf are downturned at 66, it being intended that a lag screw 68 be used at each side of the casing for lending rigidity to the shelf provided by the channel-shaped section 64. Mounted on the channel-shaped section 64 is a lug 70 held in place by a bolt 72. It will be perceived that the lug 70 is directly under an aperture 74 formed in the top panel 22.

Owing to the presence of the aperture 74 plus the alignment of the lug 70 therebeneath, it is easy to place a tubular post 76 of appropriate length into the aperture 74 so that the bottom of the post 76 rests on the channel 64, being restrained from shifting by virtue of the upstanding lug 70. A central section of the post 76, it might be mentioned, has been removed because of space limitations on the drawing. Although not a part of the invention, the tubular post 76 carries at its upper end a reel 78 having wound thereon a fishing line 80. The fishing line 80, in use, extends through the slot 42 and for the sake of completeness a bobber or float 72 has been shown attached to the line 70.

From the information that has been presented, the use of my ice fishing hole heater should be readily understood. Assuming that the casing 10 is to be placed on a layer of ice 82, a hole 84 is first cut in the ice. Having cut the hole 84, the end portion of the casing 10 having the doors 30, 38 thereon is positioned over the hole.

With charcoal or the like burning in the receptacle 46, the charcoal being easily placed within the receptacle via the open upper end, heat will circulate throughout the interior of the casing 10, thereby warming the air over the hole 84 to such an extent that the hole will not refreeze. As previously indicated, the rear wall 14 can be faced or directed toward the wind and then the amount of air entering through the aperture 58 can be controlled by the damper 60 to assure that sufficient warm air passes over the hole 84.

It is also intended to control the temperature of the air passing over the hole 84 by adjusting the position of the damper 50. The damper 50 is easily swung into a fully closed or covering position with the receptacle 46 or any partially covering positioning. In this way, it is readily apparent that the amount of air entering into the receptacle 46 can be controlled so that the requisite amount of heat for a given set of conditions can be generated. It has already been mentioned that in some instances a large amount of heat for body warming purposes may be desired at times, such amount of heat being considerably greater than the amount of heat needed to keep the hole 84 from refreezing.

Whenever a fish takes the bait at the end of the fishing line 70, it will be recognized that the reel 78 easily rotates and the rotation thereof will serve as a visible indication to the fisherman, who may be located at a considerable distance from the heater, that he should devote personal attention to landing the fish. The fisherman can then quickly open both of the doors 30, 38. The fishing line 70 can then be pulled upwardly and the fish taken out through the ice hole 84 and the space now made available by the opened doors. It should be borne in mind that the front wall 12 is of a relatively low height so that the fish can be pulled upwardly and thereover with little likelihood of interference. While pulling in the line 70, the fisherman is afforded good visibility as to what is taking place beneath the surface of the water. In this regard, even if the fish has pulled the line to one side, the view of the fisherman in the desired angular direction can be such that the fish can be seen. As hereinbefore pointed out, the view is through substantially an arc of 270 degrees, being obstructed only when the fish moves in a direction such that the top panel 22 will be in the line of sight.

While it is believed apparent that the slot 42 permits considerable freedom of the line when the doors 30, 38 are closed, to avoid any chance of the line 70 freezing against the edges of the doors the edges can be suitably taped so that a damp line cannot freeze to the adjacent edges and prevent the reel 78 from turning or rotating even when the fish has not been firmly impaled on the hook. Also, with respect to the line 70, it will be obvious from an inspection of FIGURE 2 that the line is held in a remote position with respect to the receptacle 46 and there is no chance of the line burning due to any intense heat. This, as pointed out hereinbefore, has proved to be a disadvantage with certain prior art devices.

While various screws have been illustrated for holding the casing 10 together, it will be appreciated that welding or soldering can be used when the casing is to be of metal.

It will, of course, be understood that various changes may be made in the form, details, arrangements and proportions of the parts without departing from the scope of my invention as set forth in the appended claims.

What is claimed:
1. An ice fishing hole heater comprising:
   (a) a casing having a top and downwardly extending walls forming an open bottom so that one end of said casing can overlie an ice fishing hole;
   (b) door means in said top at said one end for providing access to said ice fishing hole, said door means including a pair of door panels hingedly connected at their remote edges to said casing and forming a slot at their adjacent edges for the accommodation of a fishing line;
   (c) the other end of said top having an opening therein;
   (d) a receptacle having a lateral flange engageable with said top so as to allow suspension of said receptacle into the interior of said casing,
   (e) whereby heat from said receptacle will circulate within said casing to keep said ice fishing hole from refreezing.

2. An ice fishing hole heater in accordance with claim 1 in which:
    (a) said door means is disposed at an inclined angle.

3. An ice fishing hole heater comprising:
    (a) a casing having a relatively low front wall, a relatively high rear wall, parallel side walls having front edges coextensive in height with said front wall and having rear edges coextensive in height with said rear wall and a horizontal top panel extending from said rear wall forwardly to a locus intermediate said front and rear walls, the upper edges of said side walls sloping downwardly from said locus to the upper edge of said front wall,
    (b) a door hingedly connected to each of said sloping edges of said side walls for providing access to an ice fishing hole when said casing is placed thereover with said doors located above said hole,
    (c) said top panel having an opening therein; and
    (d) a receptacle of a size to depend through said opening and having an upper lateral flange engageable with said top panel for supporting said receptacle so that the bottom thereof is adapted to be maintained above the ice,
    (e) whereby heat from burning fuel contained in said receptacle will circulate within said casing to prevent said ice fishing hole from refreezing.

4. An ice fishing hole heater in accordance with claim 3 in which:
    (a) one of said doors is formed with a notch extending along its free edge so as to provide a slot for the accommodation of a fishing line when said doors are closed.

5. An ice fishing hole heater in accordance with claim 4 in which:
    (a) said rear wall has an aperture nearer its lower edge, and
    (b) a pivoted damper cooperable with said aperture for controlling the air entering said aperture when said rear wall is facing into the wind.

6. An ice fishing hole heater in accordance with claim 5 including:
    (a) a pivoted damper of sufficient size to close the flanged end of said receptacle for controlling the rate of burning of fuel contained in said receptacle.

7. An ice fishing hole heater comprising:
    (a) a casing forming an enclosure open at the bottom adjacent at least one end thereof so as to overlie an ice fishing hole;
    (b) door means in the upper portion of said casing adjacent said one end for providing access to said ice fishing hole;
    (c) a receptacle having an open upper end supported by the upper portion of said casing adjacent the other end thereof for containing fuel,
    (d) whereby heat from said receptacle will circulate within said casing to keep said ice fishing hole from refreezing, and
    (e) a pivoted damper cooperable with the open upper end of said receptacle for controlling the admission of air thereto.

8. An ice fishing hole heater comprising:
    (a) a casing having a top and downwardly extending walls forming an open bottom so that one end of said casing can overlie an ice fishing hole;
    (b) a pair of hinged doors having overlapping marginal edges,
    (c) one of said doors having an elongated notch extending along its said marginal edge to provide a slot for a fishing line when said doors are closed,
    (d) the other end of said top having an opening therein, and
    (e) a receptacle having a lateral flange engageable with said top so as to allow suspension of said receptacle into the interior of said casing,
    (f) whereby heat from said receptacle will circulate within said casing to keep said ice fishing hole from refreezing.

9. An ice fishing hole heater comprising:
    (a) a casing having a horizontal flat panel and wall means extending downwardly therefrom,
    (b) said panel having an opening therein for the accommodation of a fuel-containing receptacle in order to supply heat to the interior of said casing, and
    (c) a pair of inclined doors;
    (d) said wall means extending subjacent the remote edges of said doors and beneath the lower edges thereof,
    (e) the remote edges of said doors being hinged to the upper edges of the subjacent portions of said wall means and the upper edges of said door means engaging said panel when closed, the adjacent edges of said doors forming a slot for the accommodation of a fishing line.

References Cited by the Examiner
UNITED STATES PATENTS

| | | | |
|---|---|---|---|
| 747,100 | 12/03 | Stockon | 126—25 |
| 2,483,787 | 10/49 | Sheraski | 126—271.3 X |
| 2,615,444 | 10/52 | Shaver | 126—367 |
| 2,677,363 | 5/54 | Bryan | 126—4 |
| 2,747,569 | 5/56 | Holm et al. | 126—271.3 X |
| 2,883,784 | 4/59 | Obernolte | 126—271.3 X |
| 3,025,852 | 3/62 | Quilling | 126—271.2 |
| 3,105,487 | 10/63 | Anderson | 126—271.3 |

JAMES W. WESTHAVER, *Primary Examiner.*